No. 862,325. PATENTED AUG. 6, 1907.
L. G. FAGERSTEN.
PORTABLE SELF COOKING CAMP STOVE.
APPLICATION FILED NOV. 13, 1906.
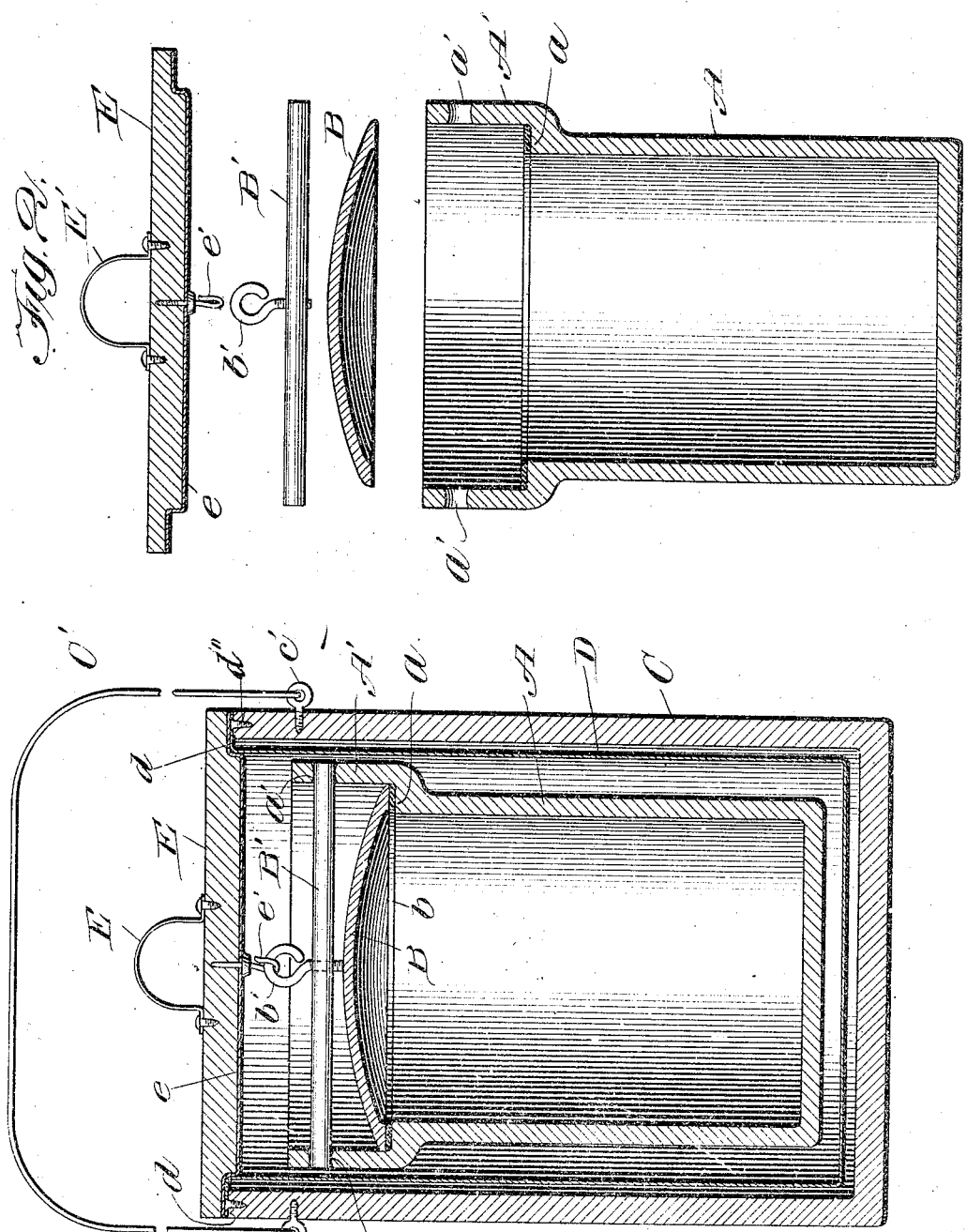

UNITED STATES PATENT OFFICE.

LORENZO G. FAGERSTEN, OF CHICAGO, ILLINOIS.

PORTABLE SELF-COOKING CAMP-STOVE.

No. 862,325. Specification of Letters Patent. Patented Aug. 6, 1907.

Application filed November 13, 1906. Serial No. 343,221.

*To all whom it may concern:*

Be it known that I, LORENZO G. FAGERSTEN, a citizen of the United States, residing at Chicago, county of Cook, State of Illinois, have invented a certain new and useful Improvement in Portable Self-Cooking Camp-Stoves, and declare the following to be a full, clear, and exact description of the same, such as will enable others skilled in the art to which it pertains to make and use the same, reference being had to the accompanying drawings, which form a part of this specification.

My invention relates in general to culinary utensils and more particularly to a container for cooking previously heated food by preventing the dissipation of the heat.

A device has heretofore been used known as a Russian hay stove comprising a wooden box filled with hay, asbestos, etc., into which a black iron boiling pot with a loose cover is placed after the food contained in the pot has been initially heated. The hay or asbestos acts as a sponge absorbing mechanically the aqueous vapor escaping from the pot. The hay in a measure prevents a too sudden loss of heat, and retains in the pot sufficient heat to cook the contents thereof, but a long time is required as the heat rapidly falls below the boiling point of water. This device is inefficient for several reasons. The wood has great absorbing power for heat and its reflecting power is almost nothing, while its radiating power is great. This is also true of the hay and especially of asbestos, which has great absorbing power, great conductivity and radiating power but no reflecting power. The black iron pot rapidly radiates the heat while the loose cover permits the rapid dissipation of the heat by allowing the steam to escape into the box.

The primary object of my invention is to provide a device of the type of the so-called Russian hay stove, but which will avoid the objections thereto above mentioned.

A further object of my invention is to provide a culinary device for containing initially heated food, which will effectively prevent the dissipation of the heat and thereby thoroughly cook the food by retaining the initial heat.

A further object of my invention is to provide a container for cooking previously heated food which will be simple in construction, inexpensive in manufacture and efficient in use.

The embodiment of my invention herein disclosed may be generally described as comprising a vessel of low heat radiating power adapted to receive the food and contain the same while being initially heated on a stove, a removable cover adapted to engage a shoulder below the top of the vessel, means for hermetically closing the receptacle by the cover when the desired degree of heat has been attained, a receptacle within which the sealed vessel is suspended, a removable cover for the receptacle from which the vessel depends, a lining made of polished metal within, but out of contact with the receptacle thereby forming an air space between the lining and receptacle, the space between the vessel and the lining being adapted to contain aqueous vapor formed by water placed above the cover of the vessel.

My invention will be more fully described hereinafter with reference to the accompanying drawing in which the same is illustrated as embodied in a convenient and practical form, and in which Figure 1 is a central vertical sectional view; and Fig. 2 a view similar to Fig. 1, the parts being shown as separated prior to inserting the vessel in the receptacle.

The same reference characters are used to designate the same parts in the several figures of the drawings.

Reference character A designates a vessel made of any suitable material, such as iron and preferably coated with white enamel. The vessel A is adapted to receive food and to be placed upon a stove while the food is being heated to a desired degree. The vessel A is provided with a shoulder $a$ on the inner surface thereof a short distance below the upper edge, thereby leaving a flange A′ surrounding the shoulder and of greater interior diameter than the shoulder.

B designates a cover for the vessel A and may be conveniently made of any suitable material, such as iron and is preferably coated with white enamel. Any suitable means may be provided for securing the cover B upon the shoulder $a$ of the vessel A so as to hermetically seal the vessel. I have shown such means to consist in a rod B′ the ends of which are adapted to be inserted through holes $a'$, $a'$ through the flange A′ of the vessel at diametrically opposite points. A screw eye $b'$ extends through a screw-threaded hole in the rod B′ and is adapted to engage the outer surface of the cover B and to force the same downwardly so that its periphery will tightly engage a gasket $b$ supported upon the shoulder $a$, and thereby hermetically seal the vessel.

C designates a receptacle made of material having as little absorptive, radiating power, and heat conductivity as possible. The receptacle may be conveniently made of chemically treated pulp compressed and preferably coated with shellac or any other substance which will impart a surface capable of reflecting heat. The compressed pulp possess an advantage over wood in that it can be made air, water and steam tight by pressure and proper sizing, and may be made at a small cost. The receptacle C is provided with suitable means for carrying the same, such for instance as a bale C′ the ends of which pivotally engage screw eyes c′, c′ secured to the receptacle on opposite sides thereof.

D designates a lining for the receptacle C which is made of polished metal preferably tin plate, owing to its low absorbing and radiating power and its great reflecting power. The exterior diameter of the lining D is less than the interior diameter of the receptacle C thereby leaving a space between the lining and receptacle containing dry air. The lining D may be conveniently supported within the receptacle by means of an outwardly projecting flange d around its upper end which overlies the upper edge of the receptacle and may be secured thereto by suitable fastening devices such as screws d′.

E indicates a cover for the receptacle C which may be made of the same material, namely compressed pulp. A lining e is secured to the under surface of the cover E and is preferably made of polished metal such as tin plate. The under surface of the cover E is preferably provided with a shoulder so as to form a central portion extending within the upper end of the lining D and a laterally projecting flange to overlie the top of the receptacle. A handle, such as E′ is preferably secured to the cover E to permit it to be readily handled. A screw hook e′ depends from the under-surface of the cover E and is adapted to removably engage the screw eye b′ on the rod B′.

The manner of using and operation of my invention are as follows: The food which is to be cooked is placed within the vessel A and the cover b allowed to loosely rest upon the gasket on the shoulder a. The vessel is then placed upon a stove until the desired degree of heat has been imparted to the food, such degree being ordinarily attained when the boiling point of water has been reached. The eye screw b′ is then rotated so as to force the cover B into tight engagement with the gasket b thereby hermetically sealing the vessel. The vessel is then removed from the stove and inserted in the receptacle C which may be conveniently done by engaging the screw hook e′ on the cover E with the screw eye b′ thereby permitting the vessel to depend from the cover and to be readily placed within the receptacle. When the vessel has been placed within the receptacle the cover is supported by its surrounding flange upon the top of the receptacle. The weight of the vessel and its contents serves to keep the cover of the receptacle in place thereon. Prior to inserting the vessel in the receptacle a small quantity of water, preferably hot, is poured on the top of the cover B within the surrounding flange A′. This water, when the vessel is placed within the receptacle, serves to fill the space between the exterior of the vessel and the interior of the lining D with desirable aqueous vapor. By thus supplying the protecting envelop of aqueous vapor from an independent source, rather than from the interior of the vessel, direct loss of heat from the vessel and its contents is avoided. If desired after the vessel has been hermetically sealed the initial heat may be raised above the boiling point of water thereby securing the more thorough and rapid cooking of the food after it has been removed from the stove and placed within the receptacle.

From the above description it will be observed that my improved container for cooking previously heated food, is so constructed as to reduce to a minimum the dissipation of the initial heat. The parts comprising my device are made of materials and are so treated as to eliminate as far as possible the absorption and radiation of the heat thereby retaining the heat within the vessel. The enamel coating of the vessel and its cover produces a reflecting and non-heating radiating surfaces, the aqueous vapor surrounding the vessel within the lining of the receptacle forms a protecting envelop while the polished metal lining D does not radiate the heat but reflects the same inwardly thereby confining it within the receptacle. The air space between the lining and the receptacle also serves as a protecting envelop while the shellac or other coating on the receptacle produces a non-radiating surface. The pulp of which the receptacle is formed also contributes towards preventing the heat being conducted away from the vessel.

My improved self cooking stove is capable of a variety of uses and serves to reduce to a minimum the time necessary to subject the food to the heat of a stove. It is merely necessary for the vessel A to remain on the stove until the boiling point of water has been reached after which it may be placed within the receptacle and completely cooked. After the vessel has been placed within the receptacle, the receptacle may be strapped to the belt of a hunter while he is tramping, or to the belt of a soldier while on the march. It is also of advantage as a household culinary utensil as it is necessary to watch the food only while it is brought to a boiling point after which the cooking is completed without need of attention.

While I have described more or less precisely the details of construction, I do not wish to be understood as limiting myself thereto, as I contemplate changes in form, the proportion of parts, and the substitution of equivalents, as circumstances may suggest, or render expedient without departing from the spirit of my invention.

Having now fully described my invention, what I claim as new and desire to secure by Letters Patent is:

1. In a container for cooking initially heated food, the combination with a vessel in which the food is initially heated, means for hermetically sealing said vessel, and a non-heat radiating receptacle in which the vessel is inclosed after the initial heating of the food, said vessel and receptacle being of such relative sizes as to form an intermediate space containing aqueous vapor.

2. In a container for cooking initially heated food, the combination with a vessel possessing low heat radiating power in which the food is initially heated, means for hermetically sealing said vessel, a non-heat radiating receptacle, said vessel and receptacle being of such relative sizes as to form an intermediate space containing aqueous vapor, and means for suspending said vessel within said receptacle.

3. In a container for cooking initially heated food, the combination with a vessel possessing low heat radiating power in which the food is initially heated, a cover for closing said vessel, a non-heat radiating receptacle in which said vessel is inclosed after the initial heating of the food, said vessel and receptacle being of such relative sizes as to form a space around the vessel containing aqueous vapor, and a lining having low heat radiating but high reflecting power within but spaced apart from said receptacle to form an air space.

4. In a container for cooking initially heated food, the combination with a vessel possessing low heat radiating power in which the food is initially heated, means for hermetically sealing said vessel, a non-heat radiating receptacle, a lining having low heat radiating but high reflecting power within but spaced apart from said receptacle to form an air space, a cover for said receptacle, and means for suspending said vessel from said cover within the receptacle.

5. In a container for cooking initially heated food, the combination with the enameled vessel in which the food is initially heated, a cover for said vessel, a non-heat radiating receptacle in which the vessel is inclosed after the initial heating of the food, and a polished tin plate lining within and spaced apart from said receptacle to form an air space.

6. In a container for cooking initially heated food, the combination with an enameled vessel in which the food is initially heated, means for hermetically sealing said vessel, a receptacle composed of pulp in which the vessel is inclosed after the initial heating of the food, and a polished tin plate lining within but spaced apart from said receptacle to form an air space.

7. In a container for cooking initially heated food, the combination with a vessel possessing low heat radiating power, a cover adapted to rest upon a shoulder below the top of said vessel thereby forming a space for containing water, means for securing said cover to the vessel to hermetically seal the latter, and a non-heat radiating receptacle in which the vessel is inclosed after the initial heating of the food, said vessel and receptacle being of such relative sizes as to form an intermediate space containing aqueous vapor generated by said water.

8. In a container for cooking initially heated food, the combination with a vessel possessing low heat radiating power, a cover adapted to rest upon a shoulder below the top of the vessel, a rod removably secured to the receptacle above said cover, a screw extending through said rod into contact with the cover, a receptacle in which the vessel is inclosed, a cover for said receptacle, and means for suspending said vessel from said cover.

9. In a container for cooking initially heated food, the combination with a vessel in which the food is initially heated, means for hermetically sealing said vessel, a receptacle in which said vessel is inclosed after the initial heating of the food, said vessel and receptacle being of such relative sizes as to form an intermediate space, and a chamber within said receptacle containing water for supplying aqueous vapor between the vessel and receptacle.

10. In a container for cooking initially heated food, the combination with a vessel possessing low heat radiating power in which the food is initially heated, a cover for closing said vessel, a non-heat radiating receptacle in which said vessel is inclosed after the initial heating of the food, said receptacle and vessel being of such relative sizes as to form an intermediate air space, means for suspending said vessel within said receptacle, said cover being located below the top of the vessel thereby forming a chamber for containing water to supply aqueous vapor between the vessel and receptacle.

In testimony whereof, I sign this specification in the presence of two witnesses.

LORENZO G. FAGERSTEN.

Witnesses:
GEO. L. WILKINSON,
HARRY S. GAITHER.